US009430586B2

(12) United States Patent
Coll et al.

(10) Patent No.: US 9,430,586 B2
(45) Date of Patent: Aug. 30, 2016

(54) REFERENCE RESOLUTION

(71) Applicant: MICROSOFT CORPORATION, Redmond, WA (US)

(72) Inventors: Alexander Coll, Seattle, WA (US); Florin Folta, Redmond, WA (US); Yan Ke, Redmond, WA (US); Jingfeng Li, Issaquah, WA (US); Venkat Sankepally, Sammamish, WA (US); Subhojit Som, Seattle, WA (US); Ze Tian, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 14/243,340

(22) Filed: Apr. 2, 2014

(65) Prior Publication Data

US 2015/0286685 A1 Oct. 8, 2015

(51) Int. Cl.
*G06F 17/30* (2006.01)
*G06F 17/27* (2006.01)

(52) U.S. Cl.
CPC ....... *G06F 17/30976* (2013.01); *G06F 17/278* (2013.01); *G06F 17/30395* (2013.01); *G06F 17/30401* (2013.01); *G06F 17/30646* (2013.01); *G06F 17/30654* (2013.01)

(58) Field of Classification Search
CPC .................. G06F 17/30976; G06F 17/30654; G06F 17/30646; G06F 17/30395; G06F 17/30401
See application file for complete search history.

(56) References Cited

U.S. PATENT DOCUMENTS

| 6,691,151 | B1 * | 2/2004 | Cheyer | G06F 9/465 |
| | | | | 707/E17.071 |
| 6,957,213 | B1 | 10/2005 | Yuret | |
| 7,555,475 | B2 | 6/2009 | Quiroga et al. | |
| 8,527,520 | B2 | 9/2013 | Morton et al. | |
| 8,594,996 | B2 | 11/2013 | Liang et al. | |
| 9,183,257 | B1 * | 11/2015 | Buchanan | G06F 17/30477 |
| 2012/0265787 | A1 * | 10/2012 | Hsu | G06F 17/3064 |
| | | | | 707/780 |
| 2014/0257811 | A1 * | 9/2014 | Lavallee | G06F 17/30976 |
| | | | | 704/244 |
| 2015/0026212 | A1 * | 1/2015 | Fink | G06F 17/30864 |
| | | | | 707/774 |

OTHER PUBLICATIONS

Sullivan, Danny, "Google's Impressive "Conversational Search" Goes Live on Chrome", Published on: May 22, 2013 Available at: http://searchengineland.com/googles-impressive-conversational-search-goes-live-on-chrome-160445.
Godden, Kurt, "Computing Pronoun Antecedents in an English Query System", In Proceedings of the 11th International Joint Conference on Artificial Intelligence, vol. 2, Aug. 20, 1989, 6 pages.
(Continued)

*Primary Examiner* — William Spieler
(74) *Attorney, Agent, or Firm* — Dave Ream; Tom Wong; Micky Minhas (57) ABSTRACT

Methods, computer systems, and computer-storage media are provided for reference resolution. The present invention seeks to resolve entities in conversational search. To enable a more natural conversational search interaction, referential expressions such as pronouns are handled in queries. A component keeps track of previous queries and performs reference resolution based on an entity in the previous query and reformulates the query using an identifier for the referenced entity. Reference resolution may be performed for pronouns, plural pronouns, partial names, across domains, and on any device or platform.

14 Claims, 5 Drawing Sheets

(56) References Cited

OTHER PUBLICATIONS

Gomez, et al., "AnaPro, Tool for Identification and Resolution of Direct Anaphora in Spanish", In Journal of Applied Research and Technology, Apr. 20, 2011, 28 pages.

Bergsma, et al., "Bootstrapping Path-Based Pronoun Resolution", In Proceedings of the 21st International Conference on Computational Linguistics and the 44th Annual Meeting of the Association for Computational Linguistics, Jul. 17, 2006, 8 pages.

Johnson, F. C., "A Natural Language Understanding System for Reference Resolution in Information Dialogues", In Proceedings of the 16th Research Colloquium of the British Computer Society Information Retrieval Specialist Group Version, Retrieved on: Jan. 6, 2014, 16 pages.

* cited by examiner

REFERENCE RESOLUTION

BACKGROUND

Conversational search refers to a natural interaction between a user and a search entity. A search entity could be a web browser, for example. Conversational search includes reference resolution where entities (e.g., nouns, subjects) are identified and resolved (mapped) to alternate identifiers (e.g., pronouns). Co-referencing is when two or more variables refer to the same thing. For example, "Sarah said she would come;" 'Sarah' and 'she' both refer to the same thing (i.e., Sarah).

Today, co-reference resolution is not handled very well in search. In particular, search engines are not able to resolve plural pronouns (e.g., they), resolve partial names (e.g., Katie referring to Katie Holmes), provide relevant web results since they often times resolve the pronoun to the wrong entity, co-reference across domains, or co-reference across any device and/or platform.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-storage media for, among other things, performing co-reference resolution in search. As mentioned, the present invention seeks to resolve entities in conversational search. To enable a more natural search interaction, referential expressions or conversational identifiers such as pronouns should be handled in queries. A component keeps track of previous queries and performs reference resolution based on an entity in the previous query and reformulates the query using an identifier for the referenced entity.

Accordingly, in one embodiment, the present invention is directed to one or more computer-storage media having computer-executable instructions embodied thereon that, when executed by one or more computing devices, perform a method of reference resolution. The method comprises, receiving a search query; parsing the search query to identify one or more of an entity identifier and a property identifier; identifying an answer to the search query; mapping each of the answer and the entity identifier to one or more conversational identifiers; and displaying the answer to the search query to a user.

In another embodiment, the present invention is directed to a computerized method comprising receiving a search query; identifying an answer to the search query; mapping one or more entities of the search query to one or more conversational identifiers; receiving a subsequent search query including at least one conversational identifier of the one or more conversational identifiers; identifying an entity associated with the at least one conversational identifier; augmenting the subsequent query to include the entity instead of the at least one conversational identifier; and displaying an answer and web results associated with the subsequent query to a user.

In yet another embodiment, the present invention is directed to one or more computer-storage media having computer-executable instructions embodied thereon that, when executed by one or more computing devices, perform a method of reference resolution. The method comprises, receiving a first search query; identifying an entity identifier and a property identifier of the first search query; identifying at least one first answer to the first search query; mapping each of the entity identifier and the first answer to one or more conversational identifiers; receiving a second search query; identifying a context switch between the first search query and the second search query; reassigning the conversational identifier to a different entity identifier; augmenting the second search query such that the conversational identifier is replaced with the different entity identifier; and displaying a second answer to the user.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-storage media for, among other things, reference resolution. The present invention is directed to resolve entities in conversational search. To enable a more natural search interaction, referential expressions such as pronouns may be addressed in queries. A component keeps track of previous queries and performs reference resolution based on an entity in the previous query and reformulates the query using an identifier for the referenced entity.

Reference resolution may be performed for a variety of referential expressions including pronouns, plural pronouns, and partial names. Reference resolution may also be performed across domains, on any device or platform, and the like. Limitations with existing technology do not allow for reference resolution of plural pronouns and partial names nor is reference resolution across domains provided in a way that is not device or platform specific. Additionally, reference resolution may be used to resolve context implicitly even when there are no referential expressions present. For instance, a query sentence of "seattle" "who is the mayor" may be transformed into "who is the mayor of it" and further resolved to "who is the mayor of seattle."

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant, a smart phone, a tablet PC, or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

Figure 1:
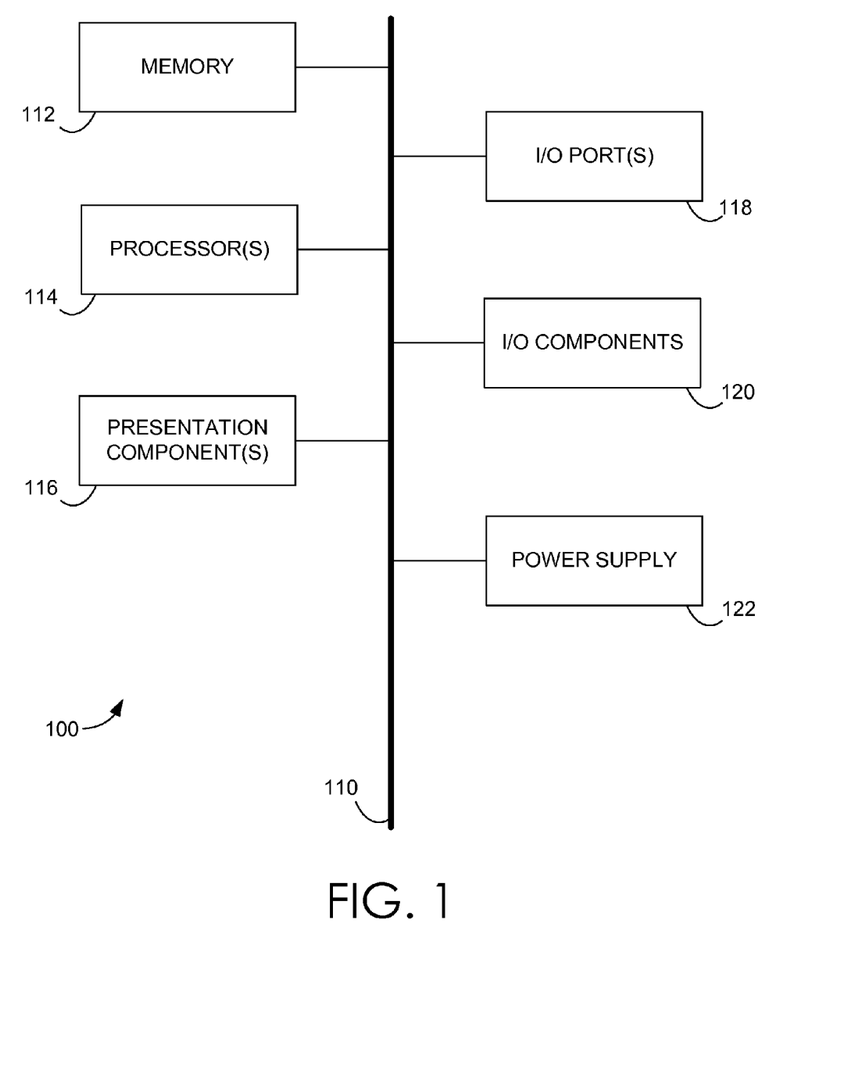
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excludes signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like. An NUI processes air gestures, voice, or other physiological inputs generated by a user. These inputs may be interpreted as search prefixes, search requests, requests for interacting with intent suggestions, requests for interacting with entities or subentities, or requests for interacting with advertisements, entity or disambiguation tiles, actions, search histories, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a computing device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a Web browser, a cloud server, a set of one or more processes distributed on one or more computers, one or more stand-alone storage devices, a set of one or more other computing or storage devices, a combination of one or more of the above, and the like.

Figure 2:
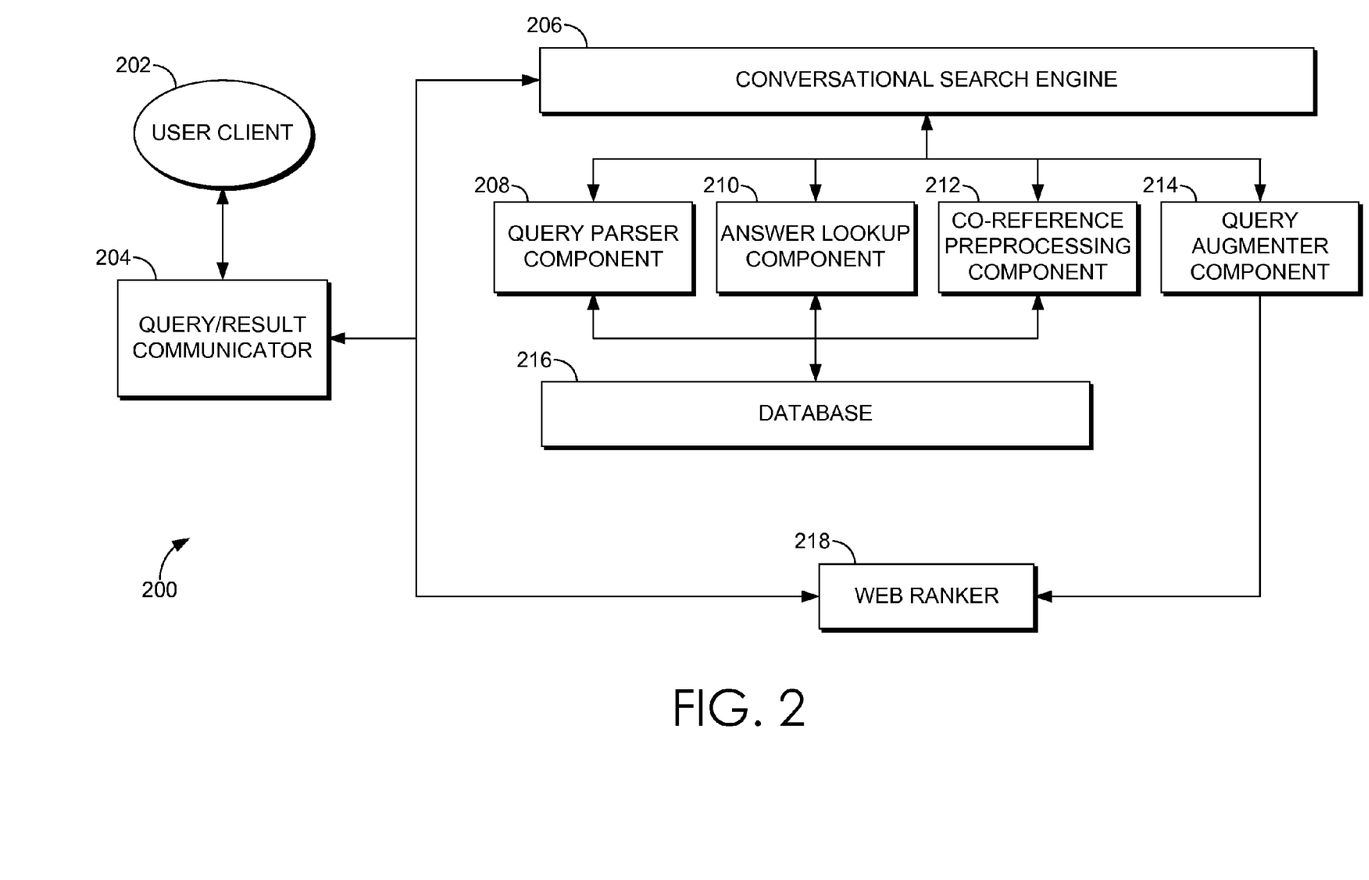
FIG. 2 is a block diagram of an exemplary system for reference resolution suitable for use in implementing embodiments of the present invention.

Referring now to FIG. 2, a block diagram is provided illustrating an exemplary computing system 200 in which embodiments of the present invention may be employed. Generally, the computing system 200 illustrates an environment where reference resolution is performed. The system may include a user client 202. The user client 202 may be any device configured to communicate search queries and receive query results. The user client 202 may be, for example, a device comparable to that described in FIG. 1.

Among other components not shown, the computing system 200 generally includes a query/result communicator 204, a conversational search engine 206, a database 216, and a web ranker 218. The conversational search engine 206 may include a query parser component 208, an answer lookup component 210, a co-reference preprocessing component 212, and a query augmenter component 214.

Not shown in FIG. 2 is a network. The network may include, without limitation, one or more local area networks (LANs) and/or wide area networks (WANs). Such networking environments are commonplace in offices, enterprise-wide computer networks, intranets and the Internet. Accordingly, the network is not further described herein.

The query/result communicator 204 may be configured for, among other things, receiving and/or communicating search queries or query related information. In particular, the query/result communicator 204 may be configured to receive a search query from the user client 202. The query/result communicator 204 may also be configured to communicate search query results to the user client 202. In order to facilitate communication to and from the user client 202, the query/result communicator 204 may be in communication with one or more other components of the system 200. For example, the query/result communicator 204 may be in communication with the web ranker 218, the conversational search engine 206, and the like. In embodiments, the query/result communicator 204 is configured to receive voice input search queries. The search queries may also be text inputs. The results may be communicated via a visual display (e.g., text), an audible output, or a combination thereof.

The conversational search engine 206 may be configured for, among other things, managing reference resolution. The conversational search engine 206 may include necessary logic regarding conversational search so that reference resolution is possible. The conversational search engine may include, among other components, a query parser component 208, an answer lookup component 210, a co-reference preprocessing component 212, and a query augmenter component 214.

The query parser component 208 may be configured for, among other things, parsing a search query for one or more of a meaning of the search query, an entity identifier, a property identifier, or the like. An entity identifier, as used herein, refers generally to a subject of a search query. Exemplary entity identifiers are nouns. For instance, in a search query reading "Tom Hanks is an actor," Tom Hanks is the noun or entity of interest and is associated with an entity identifier. A property identifier, as used herein, refers generally to a search category of a search query. For example, in a search query reading "Who is Tom Cruise married to," Tom Cruise is the entity identifier and marriage, the search category, is the property identifier. The query parser component 208 may be configured to identify each of the entity identifier and property identifier, among other things. The query parser component 208 is further configured to map the entity or subject to the entity identifier and the search category to the property identifier. For instance the above example may be mapped as follows:

(TomCruiseEntityID, MarriagePropertyID)

The parsed query may then be communicated to the answer lookup component 210. The answer lookup component 210 may be configured for, among other things, identifying an answer to the search query. Typically, the answer is a fact answer which is a fact returned in response to a question. Other times, the answer may be an image, a video, a weather forecast, maps, news, and the like. Answers may be mapped to entity identifiers of their own. For clarity, the entity identifiers associated with answer may be referred to as answer entity identifiers, which simply indicates the entity was identified as an answer in response to a search query.

The co-reference preprocessing component 212 may be configured for, among other things, resolving possible co-references and associating conversational identifiers with appropriate entities. Conversational identifiers, as used herein, refer generally to referential expressions (pronouns, plural pronouns, partial names, etc.). For example, in the above search query "Who is Tom Cruise married to," the co-reference preprocessing component 212 may map Tom Cruise to "him." The co-reference preprocessing component 212 may map entities to pronouns, plural pronouns, partial names, etc. An additional example for a search query "Tom Cruise wives" may be mapped as ("him", TomCruiseEntityID), ("they", KatieHolmesEntityID, NicoleKidmanEntityID, MimiRogersEntityID). Previous solutions would not map 'they' to each of Tom Cruise's wives. Rather, it would not be mapped at all (as it is a plural pronoun). Thus, subsequent queries referring to 'they' such as "How old are they" would, in previous solutions, be met with the age of Tom Cruise, as the only referenced identifier. The present invention is able to identify that 'they' refers to each of the wives of Tom Cruise and an age for each wife may be returned. Plural pronouns such as "they", "them", "their", etc. may be resolved to multiple entities and questions may be answered about those entities simultaneously.

The co-reference preprocessing component 212 may also be configured to map to partial names. For instance, in the previous example, further mappings may be made such as ("Katie", KatieHolmesEntityID), ("Nicole", NicoleKidmanEntityID), and the like. For instance, a subsequent query asking "How old is Nicole" would, in the present invention, be quickly identified as referring to Nicole Kidman as the co-reference preprocessing component 212 has already identified partial name mappings.

The results of each of the query parser component 208, the answer lookup component 210, and the co-reference preprocessing component 212 may be stored in database 216. The database 216 may be any component with means to store the information described above.

The query augmenter component 214 may be configured for, among other things, augmenting a query. The query augmenter component 214 may change the form of a query such that referential expression (pronoun, plural pronoun, partial name, etc.) is replaced with its mapped identifier. This may increase the relevance of web results. For instance in the query "How old is Nicole," the referential expression "Nicole" may be replaced with its identifier "Nicole Kidman" such that the query now reads "How old is Nicole Kidman." The query augmenter component 214 generally only augments subsequent queries as a first/initial query should not contain referential expressions. In the case of a first query, the first query may still be communicated to and go through the query augmenter component 214 but the query augmenter component 214 does not change anything in the first query.

The query is then communicated to the web ranker 218. The web ranker 218 may be configured for, among other things, identifying one or more web results associated with the query. Thus, in embodiments, a user may be presented with both a fact answer (located by, for example, the answer lookup component 210) and a web result (located by, for example, the web ranker 218). Each of the fact answer and the one or more web results is communicated to the query/result communicator 204 and further communicated to the user client 202.

In application, a search query (either voice input or text input) is communicated from the user client 202 to the query/result communicator 204. For the purpose of this example, assume the voice input search query is "Who was Tom Cruise married to." The query/result communicator 204 communicates the query to the conversational search engine 206. The conversational search engine 206 first communicates the search query to the query parser component 208. The query parser component 208 attempts to resolve the query into an entity identifier and a property identifier for storage in the database 216. In this example, the query parser component 208 may interpret the query as:

(TomCruiseEntityID, MarriagePropertyID)

The conversational search engine 206 then sends the parsed query to the answer lookup component 210 to look up an answer to the question. The entity identifiers referenced in the answers are also stored in the database 216. The answer lookup component 210 may, in this case, come up with the following answer:

(KatieHolmesEntityID, NicoleKidmanEntityID, MimiRogersEntityID)

The conversational search engine 206 then sends the entity identifiers to the co-reference preprocessing component 212. The co-reference preprocessing component 212 reads metadata associated with the entity identifiers and pre-resolves possible co-references. The possible co-references may be stored in the database 216 for future use. The co-reference preprocessing component 212 may come up with the below mappings, among others.

("him", TomCruiseEntityID), ("they", KatieHolmesEntityID, NicoleKidmanEntityID, MimiRogersEntityID), ("Katie", KatieHolmesEntityID)

In this instance, the query is a first query so the query augmenter component 214 does not have any referential expressions to address. Thus, the query goes through the query augmenter component 214 but is not changed. The query augmenter component 214 then sends the query on to the web ranker 218 to identify one or more web results associated with the query. The one or more web results and the fact answer identified by the answer lookup component 210 are then communicated to the query/result communicator 204 for further communication to the user client 202.

Assume a subsequent query is issued; for example, "How old are they." As with the first query, the query/result communicator 204 communicates the query to the conversational search engine 206 where it is then communicated to the query parser component 208. The query parser component 208 attempts to parse the query into an entity identifier and property identifier. As a subsequent query, the data previously identified with respect to the first query is accessible from the database 216. A history of multiple referenced entities and property may be stored in database 216 and associated with a unique user and/or session ID to enable co-reference resolution of the entities and properties in subsequent queries. The ability to cache co-references makes subsequent lookups extremely fast and reduces latency associated with follow up questions.

Thus, the query parser component 208 uses the metadata to resolve co-references in the query to return (EntityID, PropertyID). The query parser component 208 is able to identify that 'they' was previously mapped to Katie Holmes, Nicole Kidman, and Mimi Rogers. Thus, the query parser component 208 may resolve the co-references as follows:

((KatieHolmesEntityID, AgePropertyID), (NicoleKidmanEntityID, AgePropertyID), MimiRogersEntityID, AgePropertyID))

Thus, the query parser component 208 has broken down the query and identified that an age for each of Katie Holmes, Nicole Kidman, and Mimi Rogers is needed to answer the query. The parsed query is then communicated to the answer lookup component 210 where the answer lookup component 210 uses the resolved query to look up the correct answer. The answer lookup component 210 may identify the following as a fact answer:

(Katie Holmes: 35, Nicole Kidman: 46, Mimi Rogers: 57)

There are no new referential expressions in the subsequent query so the co-reference preprocessing component 212 does not need to create any new mappings in this example. If there were new referential expressions, or referential expressions that the co-reference preprocessing component 212 had not already mapped, then the co-reference preprocessing component 212 may create those mappings for storage in the database 216.

The query augmenter component 214 may augment the query or add additional terms and metadata to the query to pass on to the web ranker 218 to find relevant web results to the resolved query. For instance, the query may be augmented such that it is sent to the web ranker 218 in the following form:

"How old is Katie Holmes, Nicole Kidman, Mimi Rogers?"

The web results and fact answer are communicated to the query/result communicator 204. The query result communicator 204 may aggregate the web results and the answer returned by the conversational search engine 206 to return to the user client 202. Because of the refined co-references of the present invention, web results are likely more relevant because the referential expressions have been resolved to the correct entity.

When context changes or switches, the co-reference preprocessing component 212 may be configured to update previously stored co-references. For example, the user may ask about a new person or a session may time out after a predetermined period of time. Specifically, after a predetermined period of time, which may be designated by an administrator, the co-reference preprocessing component 212 may remove stale co-references from the database 216 as they are not likely relevant anymore. A context switch will also result in clearing the database 216 of previous co-references. For instance, if a previous query related to Tom Cruise but then a subsequent query asked about his son, any co-references for "he" mapped to Tom Cruise may be removed as they are no longer relevant to Tom Cruise but, rather, would like refer to Tom Cruise's son, the subject of the subsequent query. The context switch may require that co-references be reassigned to new entity identifiers.

Embodiments of the present invention are intended to yield responses across domains. Other domains besides fact-based answers are possible such as images, videos, weather forecasts, maps, news, and the like. In sum, the answers do not have to be simply fact-based answers. For example, when a user asks "Where is Barack Obama born," followed by "What's the weather like there", the local weather for Honolulu (the answer to the previous question) is returned. Another example may be a user asking a specific question about Seattle where a fact is returned. A user may then follow up with "What does it look like there" and an image may be returned. Additionally, the present invention is also able to be implemented on any platform or device.

Figure 3:
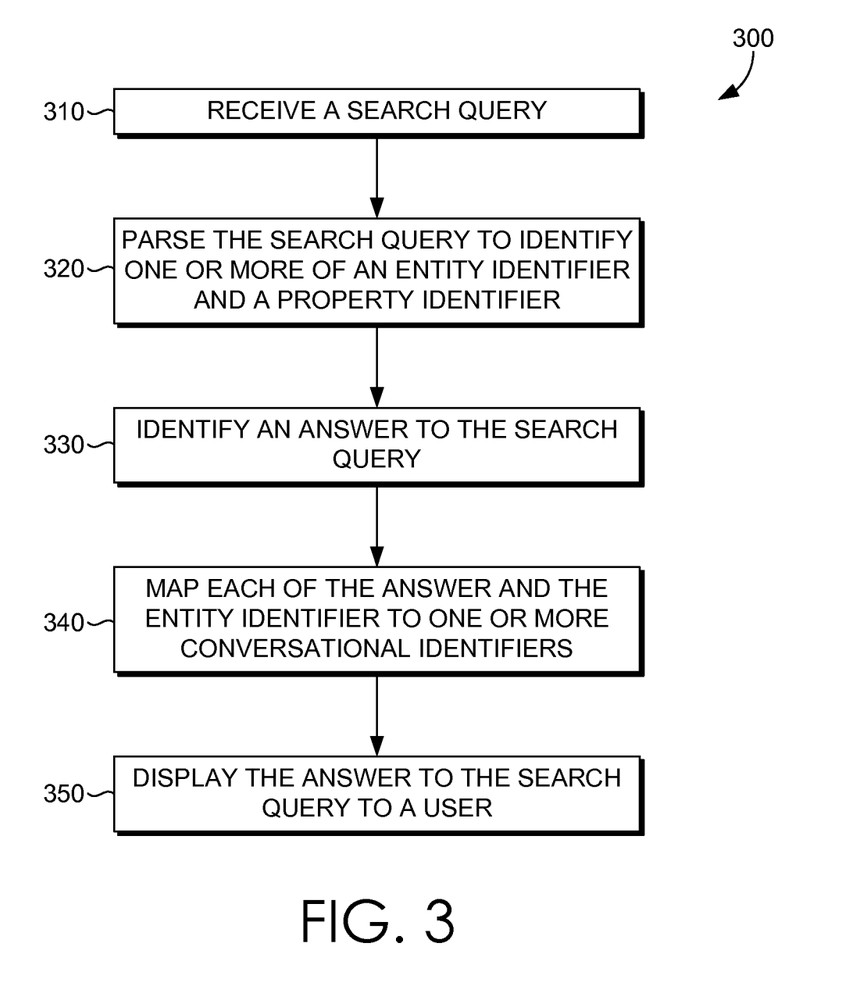
FIG. 3 is a flow diagram of an exemplary first method for reference resolution, in accordance with an embodiment of the present invention.

Turning now to FIG. 3, a flow diagram is depicted of an exemplary method 300 of reference resolution. Initially, at block 310, a search query is received. The search query may be a voice input search query. At block 320 the query is parsed to identify one or more of an entity identifier and a property identifier. At block 330 an answer to the search query is identified. At block 340 each of the answer and the entity identifier is mapped to one or more conversational identifiers. The conversational identifiers may include pronouns, plural pronouns, partial names, etc. At block 350 the answer is displayed to a user. The answer may be displayed in combination with relevant web results.

Figure 4:
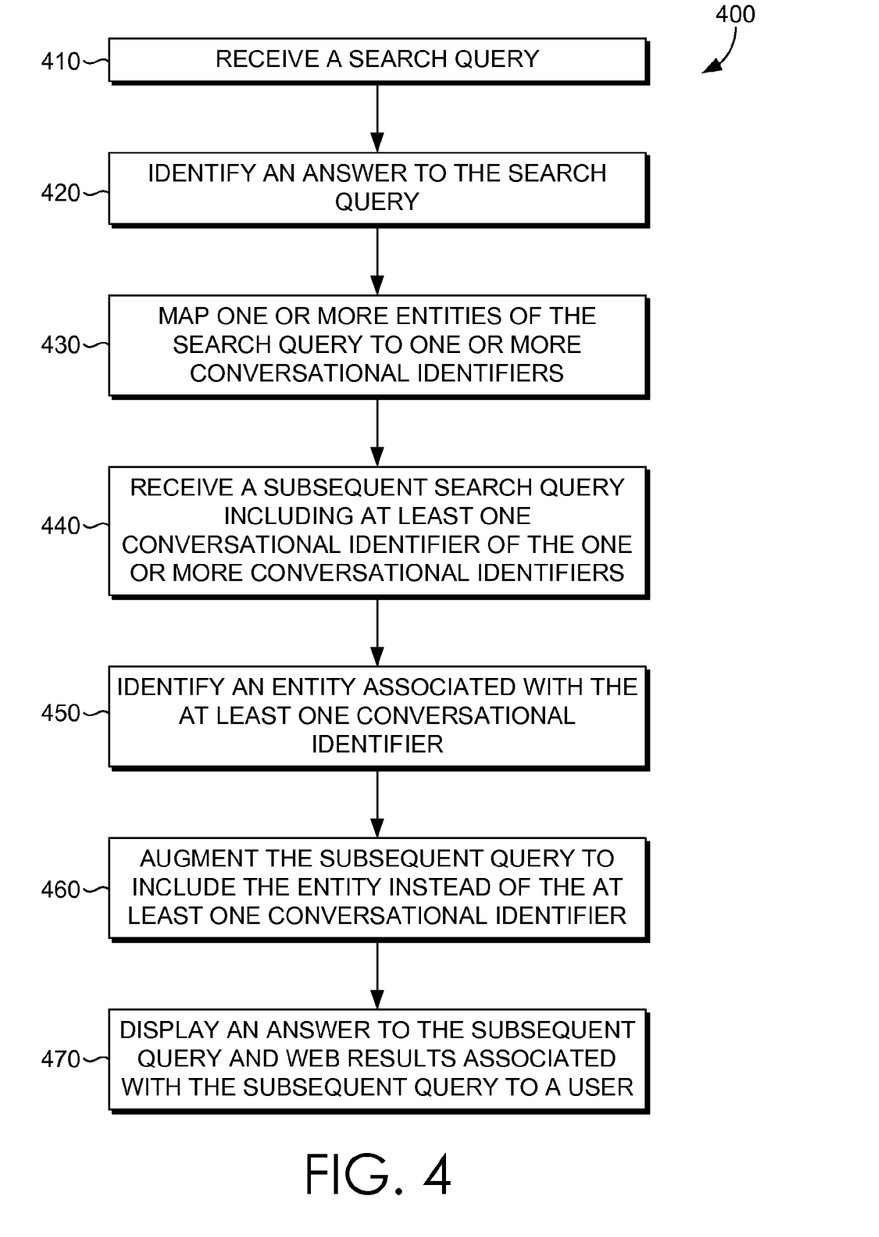
FIG. 4 is a flow diagram of an exemplary second method of reference resolution, in accordance with an embodiment of the present invention.

Turning now to FIG. 4, a flow diagram is depicted of an exemplary method 400 of reference resolution. At block 410 a search query is received. The search query may be a voice input search query. At block 420 an answer to the search query is identified. At block 430 one or more entities of the search query is mapped to one or more conversational identifiers. Conversational identifiers include pronouns, plural pronouns, partial names, and the like. At block 440 a subsequent query is received that includes at least one conversational identifier of the one or more conversational identifiers. At block 450 an entity associated with the at least one conversational identifier is identified. At block 460 the subsequent query is augmented to include the entity instead of the at least one conversational identifier. At block 470 the answer to the subsequent query as well as web results associated with the subsequent query are displayed to the user.

Figure 5:
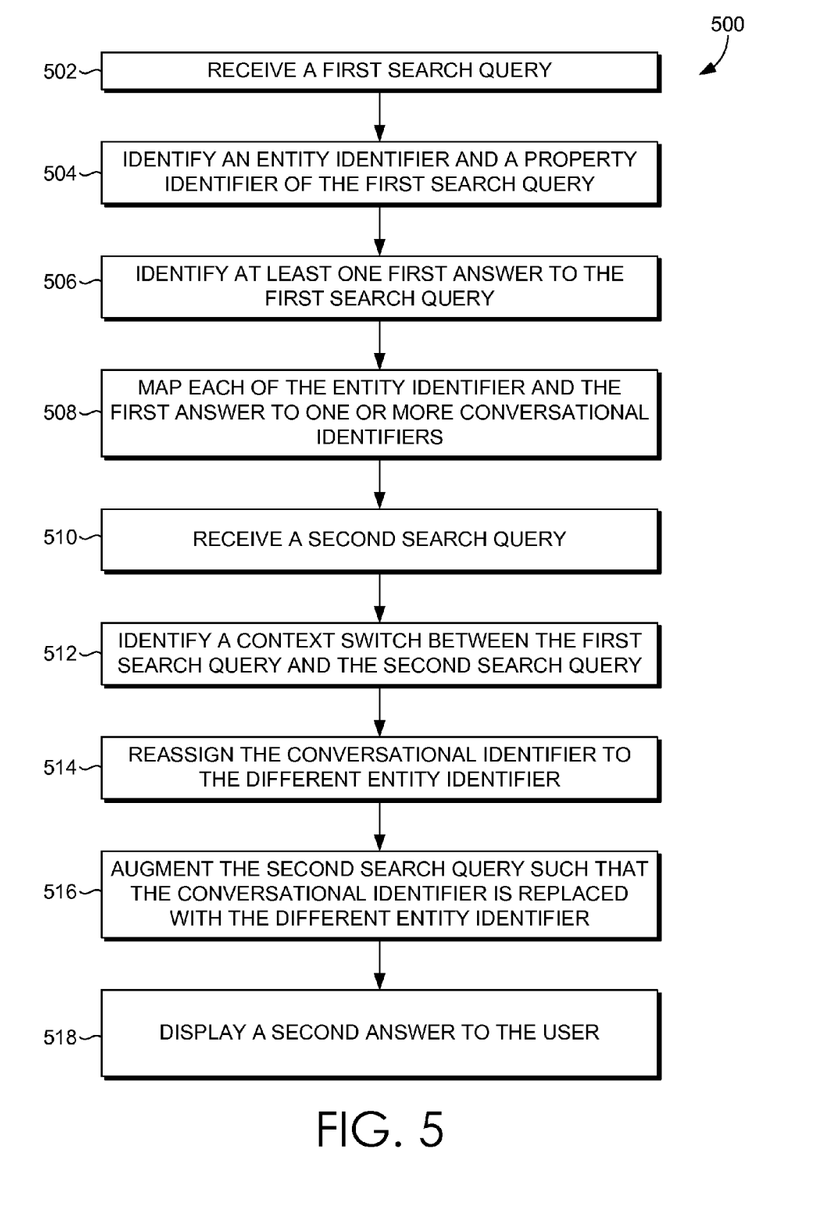
FIG. 5 is a flow diagram of an exemplary third method of reference resolution, in accordance with an embodiment of the present invention.

Turning now to FIG. 5, a flow diagram is depicted of an exemplary method 500 of reference resolution. Initially, a first search query is received at block 502. An entity identifier and a property identifier of the first search query are identified at block 504. At block 506 at least one first answer to the first search query is identified. At block 508 each of the entity identifier and the first answer is mapped to one or more conversational identifiers. At block 510 a second search query is received. At block 512 a context switch between the first search query and the second search query is identified. At block 514 the conversational identifier is reassigned to a different entity identifier. At block 516 the second search query is augmented such that the conversational identifier is replaced with the different entity identifier. At block 518 a second answer is displayed to the user.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer-storage media having computer-executable instructions embodied thereon that, when executed by one or more computing devices, perform a method, the method comprising:
   receiving a search query;
   parsing the search query to identify one or more of an entity identifier and a property identifier, wherein an entity identifier is a subject of the search query and a property identifier is a search category associated with the search query;
   identifying an answer to the search query;
   mapping each of the answer and the entity identifier to one or more conversational identifiers, wherein conversational identifiers include one or more of plural pronouns or partial names, and wherein a partial name includes a first name of an individual; and
   displaying the answer to the search query to a user.

2. The media of claim 1, wherein the search query is a text input or a voice input.

3. The media of claim 1, wherein the answer is displayed in combination with one or more web search results.

4. The media of claim 1, wherein the mappings to conversational identifiers are saved in a database.

5. The media of claim 1, further comprising resolving a subsequent search query across a different domain than a domain associated with the search query.

6. A computerized method, the method comprising:
   receiving a search query;
   identifying an answer to the search query;
   mapping one or more entities of the search query to one or more conversational identifiers, wherein conversational identifiers include one or more of plural pronouns or partial names, and wherein a partial name includes a first name of an individual;
   receiving a subsequent search query including at least one conversational identifier of the one or more conversational identifiers;
   identifying an entity associated with the at least one conversational identifier;
   augmenting the subsequent query to include the entity instead of the at least one conversational identifier; and
   displaying an answer to the subsequent query and web results associated with the subsequent query to a user.

7. The method of claim 6, wherein the search query is a text input or a voice input.

8. The method of claim 6, wherein the at least one conversational identifier in the subsequent query is replaced with the entity.

9. The method of claim 8, wherein the entity is a full name of a person.

10. The method of claim 6, wherein the answer to the subsequent query is a fact answer to the subsequent query and the web results include one or more web pages associated with the subsequent query.

11. One or more computer-storage media having computer-executable instructions embodied thereon that, when executed by one or more computing devices, perform a method, the method comprising:
- receiving a first search query, wherein the first search query is a voice input;
- identifying an entity identifier and a property identifier of the first search query, wherein an entity identifier is a subject of the first search query and a property identifier is a search category associated with the first search query;
- identifying at least one first answer to the first search query;
- mapping each of the entity identifier and the first answer to one or more conversational identifiers, wherein conversational identifiers include one or more of plural pronouns or partial names, and wherein a partial name includes a first name of an individual;
- receiving a second search query, wherein the second search query is a voice input;
- identifying a context switch between the first search query and the second search query, wherein a context switch indicates a reassignment of a conversational identifier to a different entity identifier;
- reassigning the conversational identifier to the different entity identifier;
- augmenting the second search query such that the conversational identifier is replaced with the different entity identifier; and
- displaying a second answer to the user, wherein the second answer is a response to the second search query.

12. The media of claim 11, wherein the context switch reassigns a pronoun to a new entity.

13. The media of claim 11, wherein the second answer is a different domain than a first answer associated with the first search query.

14. The media of claim 13, wherein the first answer is a fact answer and the second answer is an image.

* * * * *